(12) United States Patent
Brown et al.

(10) Patent No.: US 6,676,852 B2
(45) Date of Patent: Jan. 13, 2004

(54) PHOSPHORESCENT THERMOPLASTIC COMPOSITION

(75) Inventors: Michael W. Brown, Mt. Vernon, IN (US); Jeremy D. Hurst, Rotterdam (NL); Steven Richard Peak, Evansville, IN (US); Philippe Schottland, Evansville, IN (US); Theodorus J. M. Timmerman, Hoogerheide (NL)

(73) Assignee: General Electric Company, Schenectady, NY (US)

( * ) Notice: Subject to any disclaimer, the term of this patent is extended or adjusted under 35 U.S.C. 154(b) by 6 days.

(21) Appl. No.: 10/160,761

(22) Filed: May 31, 2002

(65) Prior Publication Data

US 2003/0227002 A1 Dec. 11, 2003

(51) Int. Cl.[7] .................................. C09K 11/02
(52) U.S. Cl. ................... 252/301.36; 524/706
(58) Field of Search ...................... 252/301.36; 524/786

(56) References Cited

U.S. PATENT DOCUMENTS

| | | | |
|---|---|---|---|
| 2,465,319 A | | 3/1949 | Whinfield et al. |
| 3,047,539 A | | 7/1962 | Pengilly |
| 4,217,438 A | | 8/1980 | Brunelle et al. |
| 5,424,006 A | | 6/1995 | Murayama et al. |
| 5,530,083 A | | 6/1996 | Phelps et al. |
| 5,607,621 A | * | 3/1997 | Ishihara et al. ........ 252/301.36 |
| 5,976,411 A | * | 11/1999 | Feng et al. ............. 252/301.35 |
| 6,375,864 B1 | * | 4/2002 | Phillips et al. ......... 252/301.33 |

FOREIGN PATENT DOCUMENTS

| | | |
|---|---|---|
| DE | 19721222 A1 | 6/1998 |
| EP | 1118649 A1 | 7/2001 |
| JP | 2000034414 | 3/2000 |
| JP | 200019448 A | 4/2000 |
| WO | WO 00/27908 | 5/2000 |

OTHER PUBLICATIONS

U.S. patent application Ser. No. 09/922,624, filed Aug. 6, 2001, "Phosphorescent Polycarbonate and Moled Articles".
PCT International Search Report for International Application No. PCT/US 03/15132, International Filing Date May 14, 2003.

* cited by examiner

*Primary Examiner*—C. Melissa Koslow

(57) ABSTRACT

Polymer composition comprising 50–99% by weight of a thermoplastic resin or a blend of thermoplastic resins, 1–50% by weight of a graft copolymer comprising a rubbery graft base upon which one or more monomers have been grafted, the quantities of (a) and (b) being calculated with respect to the sum of (a) and (b) taken together; and a phosphorescent pigment with an aluminate matrix expressed by M-Al, in which M is at least one metal element selected from calcium, strontium and barium and Al represents an aluminate group. The aluminate group can be for example a $Al_2O_4$-group. The invention also relates to concentrates that are suitable for making the polymer composition of the invention.

16 Claims, No Drawings

PHOSPHORESCENT THERMOPLASTIC COMPOSITION

BACKGROUND OF THE INVENTION

The invention relates to thermoplastic compositions comprising one or more thermoplastic resins and a phosphorescent compound with an aluminate matrix. The compositions of the invention are particularly suitable for injection molding processes. The invention also relates to objects obtained by injection molding of the compositions according to the invention.

The addition of phosphorescent pigments to substantially transparent polymers generally provides the composition with good glow performance characteristics. The use of substantially transparent polymeric matrices such as polycarbonate allows the composition to be easily and efficiently excited by light. Moreover, the subsequent emissions of phosphorescent light from the composition are not filtered or scattered, except by the pigments themselves.

Phosphorescent compounds with an aluminate matrix are well known. U.S. Pat. No. 5,424,006 describes this type of phosphors and refers to the possibility to mix them into a plastic material.

U.S. Pat. No. 5,607,621 describes phosphorescent synthetic resin materials comprising about 5 to about 20% by weight of similar aluminate based phosphors and a synthetic resin. Many synthetic resins are mentioned by way of example.

U.S. Pat. No. 5,976,411 describes molded, extruded or formed phosphorescent plastic articles made out of a plastic composition comprising a thermoplastic or a thermosetting resin, about 1% to about 50% by weight of a phosphorescent pigment and about 0.001% to about 20% by weight of a laser energy absorbing additive. Polycarbonate has been mentioned as one of the many suitable resins.

U.S. Pat. No. B1-6,375,864 describes compositions and molded, extruded or formed phosphorescent plastic articles produced therefrom comprising phosphorescent phosphor pigments preferably in combination with polymer-soluble daylight fluorescent dyes.

JP-A-2000-034 414 describes semitransparent light-storing resins which contain in total 1–4% by weight of a light storing pigment. According to JP-A-2000-034 414 it was common to use pigments with a very wide range of particle sizes varying from several tens micrometers to hundreds of micrometers and an average particle size of about 10–20 micrometer. JP-A-2000-034 414 seeks to improve the balance of relative density of residual luminescence and the light transmission of the known compositions by using pigments with above described particle size. Upon incorporation of the pigments of JP-A-2000-034 414 in a polycarbonate resin, the favorable physical properties of the polycarbonate get lost. The aluminate particles are very hard and cause wear of the screws in injection molding machinery. The wear is so strong that graying of the composition processed with the screw may result.

U.S. patent application Ser. No. 09/922,624 filed on Aug. 6, 2001, describes transparent or translucent thermoplastic compositions comprising a thermoplastic polycarbonate resin and a phosphorescent pigment (phosphor). The phosphor is present in a quantity of 0.01 to 2.0% by weight. The phosphor should have a median particle size of less than 10 micrometer.

Unfortunately the addition of phosphorescent pigments (phosphors) causes degradation of the matrix because of the abrasive nature of the pigment particulates. This results in graying of the matrix due to polymer degradation during the compounding process. Further, the addition of very small quantities of phosphorescent pigment to a polycarbonate matrix causes a significant decrease in impact properties. There accordingly exists a need for polycarbonate components and parts that exhibit good glow performance characteristics, as well as low temperature ductility and impact strength.

It is a common belief that optimal phosphorescence can be obtained with transparent or translucent materials only.

SUMMARY OF THE INVENTION

It has now be found that it is possible to obtain thermoplastic compositions with a good phosphorescence even when the compositions are not transparent or highly translucent by incorporating in the thermoplastic composition a graft copolymer with a rubbery graft base upon which one or more monomers have been grafted. It has also become possible to obtain less graying of the composition of the invention when processed with the screws of injection molding machines.

The addition of graft copolymers to transparent polymers generally causes the blend to be translucent or opaque and it would therefore be anticipated that the addition of a graft copolymer to improve the impact properties of a polymer containing a phosphorescent pigment would therefore retard the afterglow characteristics of such a composition. It has been unexpectedly discovered however, that the addition of a graft copolymer to a thermoplastic resin containing phosphorescent pigments detailed below provides the composition with brighter and longer afterglow properties along with low temperature ductility. These compositions can be utilized in a large number of commercial applications especially in automobiles, decorative housing for computers and telecommunication equipment.

The invention deals with thermoplastic compositions comprising a thermoplastic resin or a blend of thermoplastic resins, a graft copolymer comprising a rubbery graft base upon which one or more monomers have been grafted and a phosphorescent pigment with an aluminate matrix expressed by M-Al, in which M is at least one metal element selected from calcium, strontium and barium and Al represents an aluminate group such as $Al_2O_4$.

The compositions of the invention preferably have a diffuse light transmission of less than 20% according to ASTM D1003 measured on parts with a thickness of 2.54 millimeter molded out of the thermoplastic composition.

The thermoplastic resin is preferably a polycarbonate resin or a blend of a polycarbonate resin and or more thermoplastic resins.

The rubbery graft base of the graft copolymer preferably has a glass transition temperature below room temperature or even more preferred below minus ten degrees Celsius. A preferred graft copolymer can be obtained by grafting one or more of the following monomers: acrylate, methacrylate, acrylonitril and a vinyl aromatic monomer on a rubbery graft base, comprising units derived from a diene.

It is possible to use aluminate phosphors that have been doped with Europium.

It is also possible to use aluminate phosphors that have been doped with Europium and at least one co-dopant like Dysprosium.

The compositions of the inventions preferably comprise per 100% by weight of the mentioned components taken together 50–98, more preferably 60–90% by weight of the thermoplastic resin or blend of thermoplastic resins, more than 1, more preferably 2–25% by weight of the graft copolymer and more than 0.01, more preferably 0.05–5% by weight of the phosphorescent pigment.

The invention also deals with concentrates suitable for making the compositions of the invention. It is possible that the concentrates are made by one company and the final composition by another company.

The concentrates of the invention comprise a thermoplastic resins and/or a graft copolymer comprising a rubbery graft base upon which one or more monomers have been grafted and a phosphorescent pigment (phosphor) with an aluminate matrix expressed by M-Al, in which M is at least one metal element selected from calcium, strontium and barium and Al represents an aluminate group such as $Al_2O_4$, in a quantity of at least 5% by weight, calculated with respect to the total quantity of the mentioned components.

Objects formed by injection molding of any of the compositions of the invention also form part of the invention.

DETAILED DESCRIPTION OF THE INVENTION

The compositions of the invention comprise the following essential components:
(a) 50–99% by weight of a thermoplastic resin or a blend of thermoplastic resins; (b) 1–50% by weight of a graft copolymer comprising a rubbery graft base upon which one or more monomers have been grafted, the quantities of (a) and (b) being calculated with respect to the sum of component (a) and (b) taken together; and (c) a phosphorescent pigment (phosphor) with an aluminate matrix expressed by M-Al, in which M is at least one metal element selected from calcium, strontium and barium and Al represents an aluminate group.

Thermoplastic Resin or Blend of Thermoplastic Resins

All kind of thermoplastic resins can be used in the compositions of the invention. It is not of importance that the resins or the blends are transparent or translucent. The addition of the graft copolymer will result in all instances in an improvement of the phosphorescence as shown in the examples by measurement of the luminescence after illuminating articles molded out of the compositions of the invention.

Suitable thermoplastic resins are for example polycarbonates, siloxane-polycarbonate block copolymers, polyesters, polyolefines, styrene polymers and styrene copolymers, PVC, polyamides, polyphenylene ethers, polyacetals, polyacrylates such as polymethylmethacrylates and blends thereof. Preferred are polycarbonates and blends comprising a polycarbonate. Blends with polycarbonate should comprise at least 60% by weight, preferably at least 70% by weight of polycarbonate based on the total amount of thermoplastic resins (a). In case of compositions comprising as component (a) or as a part of component (a) a polycarbonate, the content of the graft copolymer is preferably between 1 and 15, more preferably between 1 and 10% by weight with respect to the sum of (a) and (b). In case of blends the most preferred blends are those comprising polycarbonate and one or more of the following: a polyester, a siloxane-polycarbonate block copolymer or a SAN copolymer.

Polycarbonates

As used herein, the term "polycarbonate" includes polymers having structural units of the formula (I):

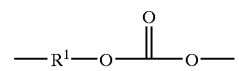

in which at least about 60 percent of the total number of $R^1$ groups are aromatic organic radicals and the balance thereof are aliphatic, alicyclic, or aromatic radicals. Preferably, $R^1$ is an aromatic organic radical and, more preferably, a radical of the formula (II):

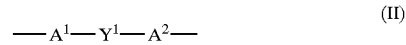

wherein each of $A^1$ and $A^2$ is a monocyclic divalent aryl radical and $Y^1$ is a bridging radical having zero, one, or two atoms which separate $A^1$ from $A^2$. In an exemplary embodiment, one atom separates $A^1$ from $A^2$. Illustrative, non-limiting examples of radicals of this type are —O—, —S—, —S(O)—, —S(O$_2$)—, —C(O)—, methylene, cyclohexyl-methylene, 2-[2,2,1]-bicycloheptylidene, ethylidene, isopropylidene, neopentylidene, cyclohexylidene, cyclopentadecylidene, cyclododecylidene, adamantylidene, and the like. In another embodiment, zero atoms separate $A^1$ from $A^2$, with an illustrative example being biphenol (OH-benzene-benzene-OH). The bridging radical $Y^1$ can be a hydrocarbon group or a saturated hydrocarbon group such as methylene, cyclohexylidene or isopropylidene.

Polycarbonates can be produced by the reaction of dihydroxy compounds in which only one atom separates $A^1$ and $A^2$. As used herein, the term "dihydroxy compound" includes, for example, bisphenol compounds having general formula (III) as follows:

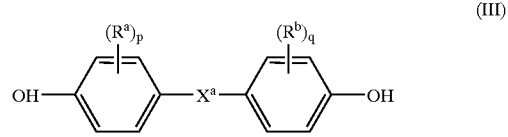

wherein $R^a$ and $R^b$ each independently represent hydrogen, a halogen atom, or a monovalent hydrocarbon group; p and q are each independently integers from 0 to 4; and $X^a$ represents one of the groups of formula (IV):

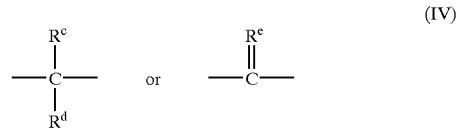

wherein $R^c$ and $R^d$ each independently represent a hydrogen atom or a monovalent linear or cyclic hydrocarbon group, and $R^e$ is a divalent hydrocarbon group.

Some illustrative, non-limiting examples of suitable dihydroxy compounds include dihydric phenols and the dihydroxy-substituted aromatic hydrocarbons such as those disclosed by name or formula (generic or specific) in U.S. Pat. No. 4,217,438. A nonexclusive list of specific examples of the types of bisphenol compounds that may be represented by formula (III) includes the following: 1,1-bis(4-hydroxyphenyl) methane; 1,1-bis(4-hydroxyphenyl) ethane; 2,2-bis(4-hydroxyphenyl) propane (hereinafter "bisphenol A" or "BPA"); 2,2-bis(4-hydroxyphenyl) butane; 2,2-bis(4-hydroxyphenyl) octane; 1,1-bis(4-hydroxyphenyl) propane;

1,1-bis(4-hydroxyphenyl) n-butane; bis(4-hydroxyphenyl) phenylmethane; 2,2-bis(4-hydroxy-1-methylphenyl) propane; 1,1-bis(4-hydroxy-t-butylphenyl) propane; bis(hydroxyaryl) alkanes such as 2,2-bis(4-hydroxy-3-bromophenyl) propane; 1,1-bis(4-hydroxyphenyl) cyclopentane; 4,4'-biphenol; and bis(hydroxyaryl) cycloalkanes such as 1,1-bis(4-hydroxyphenyl) cyclohexane; and the like as well as combinations comprising at least one of the foregoing bisphenol compound.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is desired for use. Generally, useful aliphatic diacids have about 2 to about 40 carbons. A preferred aliphatic diacid is dodecandioic acid.

Siloxane-polycarbonate block copolymers have been recognized for their low temperature ductility and flame retardancy and may also be utilized as the matrix for incorporating the phosphorescent pigments. These block copolymers can be made by introducing phosgene under interfacial reaction conditions into a mixture of a dihydric phenol, such as BPA, and a hydroxyaryl-terminated polydiorganosiloxane. The polymerization of the reactants can be facilitated by use of a tertiary amine catalyst.

Some of the hydroxyaryl-terminated polydiorganosiloxanes that may be used include phenol-siloxanes of the formula (VII)

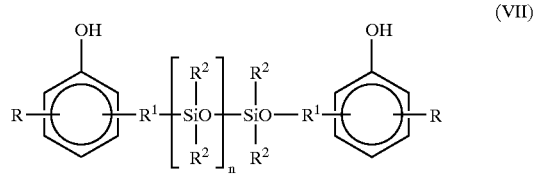

(VII)

where each R may be the same or different and is selected from the group of radicals consisting of hydrogen, halogen, $C_{(1-8)}$ alkoxy, $C_{(1-8)}$ alkyl and $C_{(6-13)}$ aryl, $R^1$ is a $C_{(2-8)}$ divalent aliphatic radical, $R^2$ is selected from the same or different $C_{(1-13)}$ monovalent organic radicals, and n is an integer greater than or equal to 1, preferably greater than or equal to about 10, more preferably greater than or equal to about 25 and most preferably greater than or equal to about 40. It is also preferred to have n be an integer less then or equal to 1000, preferably less than or equal to 100, more preferably less than or equal to about 75 and most preferably less than or equal to about 60.

Some of the radicals included within R in the above formula (VII) are halogen radicals, such as bromo, and chloro; alkyl radicals such as methyl, ethyl, and propyl; alkoxy radicals such as methoxy, ethoxy, and propoxy; aryl radicals such as phenyl, chlorophenyl, and tolyl. Radicals included within $R^1$ are, for example, dimethylene, trimethylene and tetramethylene. Radicals included within $R^2$ are, for example, $C_{(1-13)}$ alkyl radicals, haloalkyl radicals such as trifluoropropyl and cyanoalkyl radicals; aryl radicals such as phenyl, chlorophenyl and tolyl. $R^2$ is preferably methyl, or a mixture of methyl and trifluoropropyl, or a mixture of methyl and phenyl.

The siloxane-polycarbonate block copolymers have a weight-average molecular weight (Mw, measured, for example, by ultra-centrifugation or light scattering) of greater than or equal to about 10,000, preferably greater than or equal to about 20,000. Also preferred is a weight average molecular weight of less than or equal to about 200,000, preferably less than or equal to about 100,000. It is generally desirable to have the polyorganosiloxane units contribute about 0.5 to about 80 wt % of the total weight of the siloxane-polycarbonate copolymer. The chain length of the siloxane blocks corresponds with about 10 to about 100 chemically bound organosiloxane units. They can be prepared such as described in for example U.S. Pat. No. 5,530,083.

Polyester

Suitable polyester resins include those derived from an aliphatic, cycloaliphatic, or aromatic diol, or at least one of the foregoing, containing from about 2 to about 10 carbon atoms, and at least one aromatic dicarboxylic acid. Preferred polyesters are derived from an aliphatic diol and an aromatic dicarboxylic acid, and have repeating units of the following general formula (I):

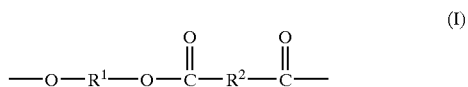

(I)

wherein $R^1$ is an alkyl or cycloaliphatic radical containing 2 to about 12 carbon atoms on average, and which is the residue of a straight chain, branched, or cycloaliphatic alkane diol having 2 to about 12 carbon atoms on average, or chemical equivalents thereof. $R^2$ is an aryl radical having 6 to about 20 carbon atoms, and which is the decarboxylated residue derived from a diacid having 6 to about 20 carbon atoms, or chemical equivalents thereof.

The diol may be a glycol, such as ethylene glycol, propylene glycol, trimethylene glycol, 2-methyl-1,3-propane glycol, hexamethylene glycol, decamethylene glycol, cyclohexane dimethanol, or neopentylene glycol; or a diol such as 1,4-butanediol, hydroquinone, or resorcinol.

Examples of aromatic dicarboxylic acids represented by the decarboxylated residue $R^2$ are isophthalic or terephthalic acid, 1,2-di(p-carboxyphenyl)ethane, 4,4'-dicarboxydiphenyl ether, 4,4' bisbenzoic acid, as well as compositions comprising at least one of the foregoing. All of these acids contain at least one aromatic nucleus. Acids containing fused rings can also be present, such as in 1,4-1,5- or 2,6-naphthalene dicarboxylic acids. The preferred dicarboxylic acids are terephthalic acid, isophthalic acid, naphthalene dicarboxylic acid or compositions comprising at least one of the foregoing dicarboxylic acids.

Also contemplated herein are the above polyesters with minor amounts, e.g., from about 0.5 to about 30 percent by weight, of units derived from aliphatic acids and/or aliphatic polyols to form copolyesters. The aliphatic polyols include glycols, such as poly(ethylene glycol). Such polyesters can be made following the teachings of, for example, U.S. Pat. Nos. 2,465,319 and 3,047,539.

Block copolyester resin components are also useful, and can be prepared by the transesterification of (a) straight or branched chain poly(1,4-butylene terephthalate) and (b) a copolyester of a linear aliphatic dicarboxylic acid and, optionally, an aromatic dibasic acid such as terephthalic or isophthalic acid with one or more straight or branched chain dihydric aliphatic glycols. For example a poly(1,4-butylene terephthalate) can be mixed with a polyester of adipic acid with ethylene glycol, and the mixture heated at 235° C. to melt the ingredients, then heated further under a vacuum until the formation of the block copolyester is complete. As the second component, there can be substituted poly (neopentyl adipose), poly(1,6-hexylene azelate-coisophthalate), poly(1,6-hexylene adipate-co-isophthalate) and the like. An exemplary block copolyester of this type is available commercially from General Electric Company, Pittsfield, Mass., under the trade designation VALOX 330.

The polyester resins can be cyclo-aliphatic polyesters. Suitable cyclo-aliphatic polyester resins are the resins comprising the reaction product of an aliphatic $C_2$–$C_{12}$ diol or chemical equivalent and a $C_6$–$C_{12}$ aliphatic diacid or chemical equivalent, said cycloaliphatic polyester resin containing at least about 80% by weight of a cycloaliphatic dicarboxylic acid, or chemical equivalent, and/or of a cyclo-aliphatic diol or chemical equivalent.

The preferred polyester molecules are derived from cycloaliphatic diol and cyclo-aliphatic diacid compounds, specifically polycyclohexane dimethanol cyclohexyl dicarboxylate. The polyester having only one cyclic unit may also be useful. The most preferred polyester has both cyclo-aliphatic diacid and cyclo-aliphatic diol components such as polycyclohexane dimethanol cyclohexyl dicarboxylate.

The second essential component of the compositions of the invention is the graft copolymer.

The thermoplastic composition comprising as component (a) a blend of a polycarbonate resin and one or more of the following thermoplastic resins: a thermoplastic polyester resin and a siloxane polycarbonate block copolymer can further be characterized by their favourable notched Izod impact strength according to ASTM D256. The notched Izod impact strength is at least 10 ft-lb/inch (at least 530 at J/m) at zero degrees Celsius, or even at −10 degrees, or more preferably at −30 degrees or at −40 degrees and most preferably at −50 degrees Celsius.

Graft Copolymer

The graft polymer having a high rubbery graft base. The glass transition temperature of the rubbery base is preferably below room temperature even more preferably below minus ten degrees Celsius. The content of the graft base is preferably above 5, more preferably above 25% by weight of the graft polymer. One or more monomers are grafted upon the rubbery base or backbone. The rubber forms the backbone of the graft polymer, and is preferably a polymer of a conjugated diene having the formula (VIII):

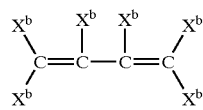

(VIII)

wherein $X^b$ is hydrogen, $C_1$–$C_5$ alkyl, chlorine, or bromine. Examples of dienes that may be used are butadiene, isoprene, 1,3-hepta-diene, methyl-1,3-pentadiene, 2,3-dimethyl-1,3-butadiene, 2-ethyl-1,3-pentadiene; 1,3- and 2,4-hexadienes, chloro and bromo substituted butadienes such as dichlorobutadiene, bromobutadiene, dibromobutadiene, mixtures comprising at least one of the foregoing dienes, and the like. A preferred conjugated diene is butadiene. Copolymers of conjugated dienes with other monomers may also be used, for example copolymers of butadiene-styrene, butadiene-acrylonitrile, and the like.

Alternatively, the backbone may be an acrylate rubber, such as one based on n-butyl acrylate, ethylacrylate, 2-ethylhexylacrylate, mixtures comprising at least one of the foregoing, and the like. Additionally, minor amounts of a diene may be copolymerized in the acrylate rubber backbone to yield improved grafting.

polymerized in the presence of the backbone polymer. One preferred type of grafting monomer is a monovinylaromatic hydrocarbon having the formula (IX):

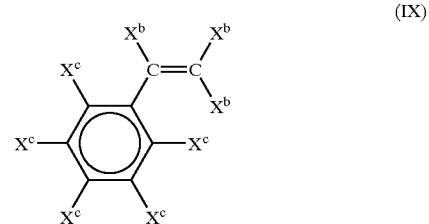

(IX)

wherein $X^b$ is as defined above and $X^c$ is hydrogen, $C_1$–$C_{10}$ alkyl, $C_1$–$C_{10}$ cycloalkyl, $C_1$–$C_{10}$ alkoxy, $C_6$–$C_{18}$ alkyl, $C_6$–$C_{18}$ aralkyl, $C_6$–$C_{18}$ aryloxy, chlorine, bromine, and the like. Examples include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, mixtures comprising at least one of the foregoing compounds, and the like. The preferred monovinylaromatic hydrocarbons are styrene and/or alpha-methylstyrene.

A second type of grafting monomer that may be polymerized in the presence of the polymer backbone are acrylic monomers of formula (X):

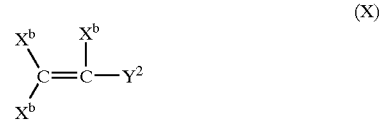

(X)

wherein $X^b$ is as previously defined and Y2 is cyano, $C_1$–$C_{12}$ alkoxycarbonyl, or the like. Examples of such acrylic monomers include acrylonitrile, ethacrylonitrile, methacrylonitrile, alpha-chloroacrylonitrile, beta-chloroacrylonitrile, alpha-bromoacrylonitrile, beta-bromoacrylonitrile, methyl acrylate, methyl methacrylate, ethyl acrylate, butyl acrylate, propyl acrylate, isopropyl acrylate, mixtures comprising at least one of the foregoing monomers, and the like. Preferred monomers include acrylonitrile, ethyl acrylate, and methyl methacrylate.

A mixture of grafting monomers may also be used, to provide a graft copolymer. Preferred mixtures comprise a monovinylaromatic hydrocarbon and an acrylic monomer. Preferred graft copolymers include acrylonitrile-butadiene-styrene (ABS) and methyl methacrylate-butadiene-styrene (MBS) resins.

The graft copolymer can be in the form of a core-shell polymer built up from a rubber-like core on which one or more shells have been grafted. The core therefore consists substantially of an acrylate rubber or a butadiene rubber, and the shell(s) preferably comprise a vinylaromatic compound and/or a vinylcyanide and/or an alkyl(meth)acrylate. The core and/or the shell(s) often comprise multi-functional compounds that may act as a cross-linking agent and/or as a grafting agent. These polymers are usually prepared in several stages.

The graft copolymers enhance the phosphorescence of the compositions of the invention. They also increase the impact strength thereof. Suitable amounts of graft copolymers are above 1% by weight of the composition, preferably from 1 to 10% by weight.

Depending on the content of the graft copolymer, the phosphorescent pigment and on their exact chemical composition it is possible to obtain out of the compositions of the inventions molded articles with a Notched Izod impact strength of a ⅛ inch (3.2 mm) standard bar of at least 10 ft-lb/inch (530 J/m) at temperatures down to minus 50 degrees Celsius.

Phosphorescent Pigment (Phosphor) with an Aluminate Matrix and Aesthetic Effects Obtained by the Phosphors The aluminate can be represented in its simplest form by the formula $Al_2O_4$. It is however known that aluminates may occur in various slightly different forms with various different chemical formulas. All metal aluminates with phosphorescent properties and with of one or more of the following metals ions: calcium, strontium and barium can be used in the compositions of the invention. The articles moulded out of the compositions of the invention are phosphorescent. Fluorescence and phosphorescence are very similar phenomena on a molecular scale. They occur when a substance absorbs radiation of a certain wavelength and re-emits photons of different wavelength. Typically, the emission of phosphorescence takes place in more than $10^{-4}$ seconds (and may last for minutes or hours) while fluorescence is an extremely brief phenomenon lasting between $10^{-4}$ and $10^{-9}$ seconds. When a phosphorescent or fluorescent molecule absorbs light, electrons are excited to a higher vibrational energy state. The molecule then loses its excess of vibrational energy by collisions and internal energy conversions and falls to the lowest vibrational level of the first excited state. From this level, the molecule can return to any of the vibrational levels of the ground state, emitting its energy in the form of fluorescence.

Long afterglow phosphorescent pigments typically absorb light between 200 and 450 nm. As a result, the light source having the most important UV contribution will be the most efficient to activate the phosphorescent formulations. Illuminant D65 (6500K light source) is an excellent reproduction of daylight including the UV range. After ten minutes of D65 illumination in a MacBeth light booth, the color chips molded from the thermoplastic resin composition of the invention exhibit a strong initial glow that decreases exponentially over several hours. In case of transparent or translucent compositions it is noteworthy that the emission is noticeably stronger on the edge of the chip because the thermoplastic resin acts as a wave-guide thus creating an "edge glow" effect. After one hour, the light emission from the face of the color chip is still up to 4000 times the visible threshold for the human eye (0.003 $mCd/m^2$). The edge glow effect adds an interesting potential in terms of design because it allows for example the realization of accent features in molded parts. The amount of edge glow effect can be reduced by addition of a light scattering agent which is typically—but not limited to—titanium dioxide, zinc oxide, or Teflon®. The scattering agent will not only make the part glow more homogeneously at night, but also give more possibilities in terms of colorability. Bright colors (like blue, yellow, green, violet, light red and orange) have been obtained and, despite the presence of colorants, exhibit a glow performance similar or better than formulations not containing the scattering agent.

It must be noted that some phosphorescent pigments can be efficiently activated by a light source without UV energy. These phosphors are indeed quickly activated by indoor light like cool white fluorescent light. They are a preferred embodiment when used in combination with light scattering agents like titanium dioxide and other colorants. Another important application of these special phosphors is in formulations containing UV stabilizers because the stabilizer screens the UV energy and therefore does not allow usual phosphors to be quickly and efficiently activated.

The chemical structure of suitable phosphorescent pigments with an aluminate matrix have been described in the above mentioned patents, in particular in U.S. Pat. No. 5,424,006. It is preferred to use phosphorescent pigments which have been doped with Europium and even more preferably with Europium and at least one co-dopant.

They are commercially available in different particles sizes from Nemoto & Co or Honeywell.

The particle size of the phosphorescent pigments as used in the thermoplastic compositions of this invention is not critical. It is possible to use rather coarse particles with a mean particle size of 20 micrometer or more. The particle size can be measured by laser diffraction method, more accurately called low angle laser light scattering (LALLS). A general description of this method can be found for example in ISO 13320, a new international standard relating to particle size analysis by laser diffraction.

Other Components of the Compositions of the Invention

The compositions of the invention may comprise further additives like anti-oxidants, mold release agents, flame retarding agents, or any combination of colorants to achieve the desired aesthetic look under day light and UV stabilizers. It is also possible to incorporate scattering agents like titanium dioxide in the compositions of the invention.

Optionally, the thermoplastic composition further contains, based on the total weight of the composition, up to about 15 wt. %, preferably no more than about 10 wt. % of a particulate inorganic filler, in order to impart desired processing and physical characteristics to the molding composition. Such characteristics include thermal stability, increased density, stiffness, lower creep, and texture. Typical inorganic fillers include but are not limited to alumina, amorphous silica, anhydrous aluminum silicates, mica, feldspar, clays, talc, glass flake, glass fibers, glass microspheres, wollastonite, metal oxides such as titanium dioxide, zinc sulfide, ground quartz, and the like. Preferred inorganic fillers include zinc oxide, barium sulfate and fiberglass, or at least one of the foregoing. Barium sulfate may be in the form of the naturally occurring barites or as synthetically derived barium sulfate. The largest dimension of the particles may vary, and can be less than or equal to about 50 micrometers, with less than or equal to about 15 micrometers preferred, and less than or equal to about 10 micrometers more preferred. Also preferred is maximum dimension of greater than or equal to about 0.1 micrometers, with greater than or equal to about 1 micrometers more preferred, and greater then or equal to about 2 micrometers especially desired.

Other additives, for example stabilizers and pigments, may also be present in the compositions in minor amounts (e.g., less than about 3 wt. % of the total composition) as is known in the art.

Processes for Manufacturing the Compositions of the Invention

The compositions of the invention can be made according to all known processes for the manufacture of compositions comprising thermoplastic resins. The compositions are preferably prepared by melt mixing the required component followed by extrusion and pelletization of the extrudate. In view of the difficulties occurring sometimes with the processing of the hard phosphorescent pigments as used in the compositions of the invention it is preferred to make first a concentrate comprising a part or all of the thermoplastic and or a part or all of the graft copolymer together with the phosphorescent pigment. Suitable concentrates comprise at least 5% by weight of the phosphorescent pigment. For example, a concentrate containing 30% by weight of phosphorescent pigment is commonly used. Such concentrate will be preferably introduced in the composition during the extrusion process (i.e. added to the melt) using a side feeder.

Objects Made Out of the Compositions of the Invention

The resin formulations from the compositions of the invention are, for instance, suitable for making objects that can be used in applications such as business equipment, computers and peripherals, consumer electronics, telecom (cell phones, personal data assistants, wireless devices), in the automotive industry (knobs, dashboards and reflectors), and helmets where the physical properties of polycarbonate are needed and a glow-in-the-dark effect is desired for aesthetic purposes. Another application would be in optical media and especially the non-information side (disk half that is not traversed by the reading laser) of optical disks like DVD-5 and DVD-9.

EXAMPLES

Example 1

The following compositions were prepared by melt mixing the indicated components in an extruder. Formulations A and C are for comparative purposes and formulations B and D are in accordance with the invention.

Polycarbonate resin formulation 1A:
  100 parts of poly(bisphenol-A carbonate) with a molecular weight (MW) of 29,900
  0.06 parts of 2,4-di-tert-butylphenol phosphite (3:1)
  0.27 parts of pentaerythritol tetrastearate
  2.0 parts of Luminova G300X (UMC-Nemoto; median particle size of about 20 microns) previously dried at 260° C. for 4 hours.

Polycarbonate resin formulation 1B:
  100 parts of poly(bisphenol-A carbonate) with a molecular weight (MW) of 29,900
  0.10 parts of 2,4-di-tert-butylphenol phosphite
  0.20 parts of antioxidant Seenox 412S
  0.30 parts of antioxidant 1076
  0.45 parts of poly(alpha-olefin) Ethylflo 166
  6.50 parts of MBS Impact modifier (methacrylate-butadiene-styrene copolymer)
  2.0 parts of Luminova G300X (UMC-Nemoto; median particle size of about 20 microns) previously dried at 260° C. for 4 hours.

A polycarbonate resin formulation 1C was prepared by mixing:
  100 parts of poly(bisphenol-A carbonate) with a molecular weight (MW) of 29,900
  0.06 parts of 2,4-di-tert-butylphenol phosphite (3:1)
  0.27 parts of pentaerythritol tetrastearate
  5.0 parts of Luminova G300X (UMC-Nemoto; median particle size of about 20 microns) previously dried at 260° C. for 4 hours.

Polycarbonate resin formulation 1D:
  100 parts of poly(bisphenol-A carbonate) with a molecular weight (MW) of 29,900
  0.10 parts of 2,4-di-tert-butylphenol phosphite
  0.20 parts of antioxidant Seenox 412S
  0.30 parts of antioxidant 1076
  0.45 parts of poly(alpha-olefin) Ethylflo 166
  6.50 parts of MBS Impact modifier (methacrylate-butadiene-styrene copolymer)
  5.0 parts of Luminova G300X (UMC-Nemoto; median particle size of about 20 microns) previously dried at 260° C. for 4 hours.

The Ethylflo has been added as a lubricant. After extrusion at 290° C. using twin screw extruder, the batches were pelletized. The resin pellets were dried 5 hours at 120° C. before molding. Test parts and 2"×3"×0.100" (i.e. 5.1×7.6×0.254 cm) color chips were injection-molded at about 300° C. Color chips corresponding to formulations 1A to 1D were exposed for 15 minutes to a D65 Illuminant in a MacBeth Spectra II light booth. The glow performances, expressed by the luminance, were measured using a Minolta LS-100 luminance meter in a custom fixture insulating the chip from the outside light. Measurements were taken 100 and 200 seconds after the chips were placed in complete darkness. Luminance data are summarized in Table I.

Physical properties of parts molded from formulation 1A to 1D were measured according to ASTM methods and are reported also reported in Table I.

It is noteworthy that the formulations 1B and 1D with the graft copolymer have a brighter glow, i.e. better glow performance as indicated by the luminance values after both 100 and 200 seconds. With only 2% pigment, formulation 1B of the invention gives an afterglow almost twice as bright as a regular polycarbonate composition 1A.

The results of the physical properties testing and especially the Notched Izod results, clearly indicate that the graft copolymer also imparts ductility to the resin formulation. In the case of formulation 1B, the material is even fully ductile at −30° C. with a Notched Izod impact value greater than 8 lbf/in (420 J/m).

TABLE I

| Property | Units | Method | 1A | 1B | 1C | 1D |
| --- | --- | --- | --- | --- | --- | --- |
| Luminance after 100 seconds, thickness 2.54 mm | $mCd/m^2$ | Proprietary | 46 | 97 | 166 | 202 |
| Luminance after 200 seconds, thickness 2.54 mm | $mCd/m^2$ | Proprietary | 25 | 54 | 94 | 116 |
| Tensile Strength, Type I, yield, 0.125" (3.2 mm) | Psi (MPa) | ASTM D 638 | 8 780 (62) | 7 510 (53) | 8 750 (62) | 7 370 (52) |
| Tensile Strength, Type I, break, 0.125" (3.2 mm) | Psi (MPa) | ASTM D 638 | 9 230 (65) | 8 240 (58) | 8 190 (58) | 7 770 (55) |

TABLE I-continued

| Property | Units | Method | 1A | 1B | 1C | 1D |
|---|---|---|---|---|---|---|
| Tensile Elong., Type I, yield, 0.125" (3.2 mm) | % | ASTM D 638 | 6.9 | 4.9 | 5.9 | 4.8 |
| Tensile Elong., Type I, break, 0.125" (3.2 mm) | % | ASTM D 638 | 130 | 140 | 100 | 130 |
| Flexural Strength, 0.125" (3.2 mm) | Psi (MPa) | ASTM D 790 | 14 500 (102) | 11 900 (84) | 14 600 (103) | 11 700 (82) |
| Flexural Modulus, 0.125" (3.2 mm) | Psi (MPa) | ASTM D 790 | 346 000 (2 440) | 295 000 (2 080) | 361 000 (2540) | 309 000 (2180) |
| N. Izod Impact (%ductility), 0.125" (3.2 mm), 23° C. | ft-lb/in [J/m] | ASTM D 256 | 3.7 (0%) [196] | 14 (100%) [742] | 2.1 (0%) [110] | 11 (100%) [583] |
| Instrumented Impact Energy @ peak, 23° C. | ft-lbs [J] | ASTM D 3763 | 31.6 [43] | 34.1 [46] | 39.7 [54] | 34.3 [46] |
| N. Izod Impact (%ductility), 0.125" (3.2 mm), minus 30° C. | ft-lb/in [J/m] | ASTM D 256 | 2.8 (0%) [149] | 8.3 (100%) [440] | 1.9 (0%) [101] | 3.7 (0%) [197] |
| Melt Volume Rate, 300° C., 1.2 kgf, 1" (2.54 cm) | cm³/10 min | ASTM D 1238 | 10.57 | 12.04 | 20.22 | 15.97 |
| HDT, 66 psi (0.45 MPa), 0.125" (3.2 mm) unannealed | ° C. | ASTM D 648 | 140.9 | 115.0 | 138.6 | 113.9 |
| HDT, 264 psi (1.82 MPa), 0.125" (3.2 mm) unannealed | ° C. | ASTM D 648 | 129.0 | 103.2 | 127.1 | 103.4 |

Example 2

Two polycarbonate resin formulations were prepared wit the following composition. Polycarbonate resin formulation 2E:

80 parts of poly(bisphenol-A carbonate) with a molecular weight (MW) of 29,900

20 parts of poly(bisphenol-A carbonate) with a molecular weight (MW) of 21,900

9.10 parts of polycarbonate-siloxane copolymer (20% siloxane content mostly D50)

0.11 parts of 2,4-di-tert-butylphenol phosphite 0.22 parts of antioxidant Seenox 412S 0.33 parts of antioxidant 1076

4.60 parts of MBS impact modifier (methacrylate-butadiene-styrene copolymer)

Polycarbonate resin formulation 2F:

80 parts of poly(bisphenol-A carbonate) with a molecular weight (MW) of 29,900

20 parts of poly(bisphenol-A carbonate) with a molecular weight (MW) of 21,900

9.10 parts of polycarbonate-siloxane copolymer (20% siloxane content mostly with a chain length of about 50 units)

0.11 parts of 2,4-di-tert-butylphenol phosphite 0.22 parts of antioxidant Seenox 412S 0.33 parts of antioxidant 1076

4.60 parts of MBS impact modifier (methacrylate-butadiene-styrene copolymer)

3.0 parts of Luminova G300FFS (UMC-Nemoto; median particle size below 2 microns) previously dried at 260° C. for 4 hours.

After extrusion at 290° C. using a twin screw extruder, the batches were pelletized. The resin pellets were dried 5 hours at 120° C. before molding. Test parts and 2"×3"×0.100" (5.1×7.6×0.254 cm) color chips were injection-molded at about 300° C. Color chips corresponding to formulation 2F were exposed for 15 minutes to a D65 Illuminant (1000 lux) in a MacBeth Spectra II light booth. The glow performances, expressed by the luminance, were measured using a Minolta LS-100 luminance meter in a custom fixture insulating the chip from the outside light.

Physical properties of parts molded from formulation 2E and 2F were measured according to ASTM methods and are also reported in Table II.

It must be noted that chips molded from formulation 2F exhibit a strong initial glow (typically greater than 1,000 mCd/m$^2$) that decreases exponentially over several hours. After 10 minutes in complete darkness, the glow (expressed by the luminance of the light emitted from the part) is still about 30 mCd/m$^2$, which exceeds the requirement defined by the European Standard DIN-65310 for phosphorescent safety devices. After five hours, the light emission from the face of the color chip is still greater than 0.3 mCd/m$^2$ which is still 100 times greater than the visible threshold for the human eye (0.003 mCd/m$^2$). The glow is therefore visible in complete darkness even 5 hours after the removal of the light source that activated the phosphorescent part. In summary, such formulation easily meets the European Standard for both glow intensity and glow duration.

The low temperature ductility of such formulation is exemplified by a Notched Izod impact greater than 11 lbf/in (585 J/m) at −30° C. and full ductile failure at −40° C. upon instrumental impact testing. This clearly indicates that this material is suitable for applications where both a strong glow and enhanced physical properties are required, as for example a phosphorescent helmet.

TABLE II

| Property | Units | Method | 2E | 2F |
|---|---|---|---|---|
| Tensile Strength, Type I, yield, 0.125" (3.2 mm) | Psi [MPa] | ASTM D 638 | 7 900 [56] | 7 660 [54] |
| Tensile Strength, Type I, break, 0.125" (3.2 mm) | Psi [MPa] | ASTM D 638 | 9 240 [65] | 8 460 [60] |

TABLE II-continued

| Property | Units | Method | 2E | 2F |
|---|---|---|---|---|
| Tensile Elong., Type I, yield, 0.125" (3.2 mm) | % | ASTM D 638 | 6.0 | 5.8 |
| Tensile Elong., Type I, break, 0.125" (3.2 mm) | % | ASTM D 638 | 127 | 118 |
| Flexural Strength, 0.125" (3.2 mm) | Psi [MPa] | ASTM D 790 | 13 200 [93] | 12 800 [90] |
| Flexural Modulus, 0.125" (3.2 mm) | Psi [MPa] | ASTM D 790 | 315 000 [2 220] | 318 000 [2 240] |
| Instr. Imp. Energy (%ductility) @ peak, 23° C. | Ft-lbs [J] | ASTM D 3763 | 50.4 [68] (100%) | 47.0 [64] (100%) |
| Instr. Imp. Energy (%ductility) @ peak, −40° C. | ft-lbs [J] | ASTM D 3763 | 55.3 [75] (100%) | 45.8 [61] (100%) |
| N. Izod Impact (%ductility), 0.125" (3.2 mm), 23° C. | ft-lb/in [J/m] | ASTM D 256 | 14.9 [790] (100%) | 14.9 [790] (100%) |
| N. Izod Impact (%ductility), 0.125" (3.2 mm), −30° C. | ft-lb/in [J/m] | ASTM D 256 | 13.0 [690] (100%) | 11.7 [620] (100%) |
| N. Izod Impact (%ductility), 0.125" (3.2 mm), −40° C. | ft-lb/in [J/m] | ASTM D 256 | 12.9 [685] (100%) | 11.5 [610] (80%) |
| Melt Volume Rate, 300° C., 1.2 kgf, 1" (2.54 cm) | cm³/10 min | ASTM D 1238 | 6.78 | 9.43 |
| HDT, 66 psi (0.45 MPa), 0.125" (3.2 mm) unannealed | ° C. | ASTM D 648 | 138.7 | 137.3 |
| HDT, 264 psi (1.82 MPa), 0.125" (3.2 mm) unannealed | ° C. | ASTM D 648 | 124.8 | 123.1 |

Example 3

Two blends of polycarbonate and SAN were prepared as follows:

Compositions

Examples 3A and 3B 26 parts by weight of a polycarbonate derived from bisphenol A with a molecular weight of (Mw) 29,900;

48 parts by weight of a polycarbonate derived from bisphenol A with a molecular weight of (Mw) 21,900, 13 parts by weight of a styrene-acrylonitrile copolymer with a acrylonitrile content of about 25% by weight; 13 parts by weight of a graft copolymer with about 50% by weight of a butadiene graft base upon which styrene and acrylonitrile have been grafted in a weight ratio of about 4:1.

0.1 parts by weight of anti-oxidant 1076;

0.2 parts by weight of penta-erythritol stearate;

0.1 parts by weight of a phosphite stabilizer; and 3 parts by weight of a phosphorescent: Luminova G-300F in case of example 4A and Luminova G-300M in case of example 4B.

Examples 3C and 3D 29.77 parts by weight of a polycarbonate derived from bisphenol A with a molecular weight of (Mw) 29,900;

55.29 parts by weight of a polycarbonate derived from bisphenol A with a molecular weight of (Mw) 21,900, 14.94 parts by weight of a styrene-acrylonitrile copolymer with a styrene content of about 25% by weight;

parts by weight of anti-oxidant 1076;

0.3 parts by weight of penta-erythritol stearate;

0.2 parts by weight of a phosphite stabilizer; and 3 parts by weight of a phosphorescent: Luminova G-300F in case of example 4C and Luminova G-300X in case of example 4D.

The compositions compounded on a twin-screw extruder at around 260° C. and pelletised. The material was dried for 2 hours at 100° C. before molding into discs (diameter 12 cm, thickness 3.2 cm), with a barrel temperature of 260° C. The discs were prepared for measurement and tested as described in Example 1. Each measurement was been performed twice and the average values are presented in Table III.

As can be seen from Table III the compositions of example 4A and 4B (which comprise a graft copolymer) have a strongly improved luminance as compared with the compositions of examples 4C and 4D.

TABLE III

| | Luminance mCd/m2 after | | | | CIELAB color coordinates | | |
|---|---|---|---|---|---|---|---|
| Example | 100 sec | 200 sec | 5 min | 10 min | L | a | B |
| 3A | 180 | 99 | 69 | 35 | 76.431 | −3.136 | 6.862 |
| 3B | 173 | 95 | 66 | 36 | 74.725 | −2.102 | 7.901 |
| 3C | 118 | 66 | 47 | 25 | 55.232 | −0.570 | 1.552 |
| 3D | 121 | 66 | 46 | 25 | 53.564 | −0.040 | 2.104 |

The results of the physical testing of Examples 3A to 3D are reported in Table IV. From the data shown in Table III and Table IV it can be concluded that Examples 3A and 3B both show a combination of improved luminescence and improved impact properties over the comparative samples 3C and 3D.

TABLE IV

| Property | Units | Method | 3A | 3B | 3C | 3D |
|---|---|---|---|---|---|---|
| Tensile Strength, Type I, yield, 0.125" (3.2 mm) | Psi [MPa] | ASTM D 638 | 8061 [57] | 8038 [57] | 9284 [66] | 9274 [66] |
| Tensile Strength, Type I, break, 0.125" (3.2 mm) | Psi [MPa] | ASTM D 638 | 6718 [47] | 6719 [47] | 7209 [51] | 7516 [53] |
| Tensile Elong., Type I, yield, 0.125" (3.2 mm) | % | ASTM D 638 | 4.90 | 4.92 | 5.30 | 5.30 |
| Tensile Elong., Type I, break, 0.125" (3.2 mm) | % | ASTM D 638 | 69.74 | 100.41 | 74.01 | 65.30 |
| N. Izod Impact, 0.125" (3.2 mm), 23° C. | ft-lb/in [J/m] | ASTM D 256 | 4.38 [232] | 4.04 [214] | 1.34 [71] | 1.18 [62] |
| N. Izod Impact, 0.125" (3.2 mm), −30° C. | ft-lb/in [J/m] | ASTM D 256 | 2.22 [117] | 2.03 [107] | 1.14 [60] | 1.13 [60] |
| N. Izod Impact, 0.125" (3.2 mm), −40° C. | ft-lb/in [J/m] | ASTM D 256 | 1.87 [99] | 1.92 [102] | 1.11 [59] | 1.19 [63] |
| Melt Volume Rate, 300° C., 1.2 kgf, 1" (2.54 cm) | cm$^3$/10 min | ASTM D 1238 | 22.606 | 21.033 | 30.652 | 31.258 |
| HDT, 66 psi (0.45 MPa), 0.125" (3.2 mm) unannealed | ° C. | ASTM D 648 | 132.4 | 132.3 | 133.3 | 133.5 |
| HDT, 264 psi (1.82 MPa), 0.125" (3.2 mm) unannealed | ° C. | ASTM D 648 | 114.5 | 113.8 | 117.7 | 117.6 |

What is claimed is:

1. A thermoplastic composition comprising:
   a) 50–99% by weight of a thermoplastic resin or a blend of thermoplastic resins;
   b) 1–50% by weight of a graft copolymer comprising a rubbery graft base upon which one or more monomers have been grafted, the quantities of (a) and (b) being calculated with respect to the sum of component (a) and (b) taken together; and
   c) a phosphorescent pigment with an aluminate matrix expressed by M-Al, in which M is at least one metal element selected from the group consisting of calcium, strontium and barium, wherein Al represents an aluminate group.

2. The thermoplastic composition of claim 1, wherein said composition has a diffuse light transmission of less than 20% according to ASTM D1003 on parts with a thickness of about 2.54 millimeter molded out of the thermoplastic composition.

3. The thermoplastic composition of claim 1, which comprises as component (a) a polycarbonate resin.

4. The thermoplastic composition of claim 1 comprising as component (a) a blend of at least 60% by weight of polycarbonate resin and not more than 40% by weight of one or more other thermoplastic resins, wherein the percentages have been calculated with respect to the sum of all the polycarbonate resin and the other thermoplastic resins.

5. The thermoplastic composition of claim 1 comprising as component (a) a blend of a polycarbonate resin and a thermoplastic resin selected from the group consisting of a thermoplastic polyester resin and a siloxane polycarbonate block copolymer.

6. The thermoplastic composition according to claim 5, wherein the composition has a notched Izod impact strength according to ASTM D 256 of at least 10 ft-lb/inch at zero degrees Celsius.

7. The thermoplastic composition of claim 1 wherein the graft copolymer agent (b) is obtained by grafting one or more monomers on a rubbery base having a glass transition temperature below 25° C.

8. The thermoplastic composition of claim 1, wherein the graft copolymer (b) is a product obtained by grafting a methacrylate and an aromatic vinyl monomer on a rubbery base, said base comprising units derived from a diene.

9. The thermoplastic composition of claim 1 comprising:
   a) 50–98% by weight of component (a):
   b) more than 1% by weight of component (b); and
   c) more than 0.01% by weight of component (c), wherein the quantities of (a), (b) and (c) taken together are 100% by weight.

10. A concentrate suitable for making the thermoplastic composition of claim 1, comprising:
    a) a thermoplastic resin or a blend of thermoplastic resins or b) a graft copolymer comprising a rubbery graft base upon which one or more monomers have been grafted; and
    c) a phosphorescent pigment with an aluminate matrix expressed by M-Al, in which M is at least one metal element selected from calcium, strontium and barium and Al represents an aluminate group, in a quantity of at least 5% by weight, calculated with respect to the total quantity of (a) and (b) together.

11. The concentrate according to claim 10, comprising:
    a) a thermopolastic resin or a blend of thermoplastic resin, and
    b) a graft copolymer comprising a rubbery graft base upon which one or more monomers has been grafted.

12. Objects molded out of the composition of claim 1.

13. Objects molded out of the compositions of claim 6.

14. A molded object of claim 13 wherein said object is used as a helmet.

15. A molded object of claim 13 wherein said object is used for personal protection.

16. A molded object of claim 13 wherein said object is used for safety applications.

* * * * *